No. 729,781. PATENTED JUNE 2, 1903.
T. MUNDORFF.
MEANS FOR MAKING BIFOCAL OPTICAL LENSES.
APPLICATION FILED AUG. 11, 1902.
NO MODEL. 2 SHEETS—SHEET 2.
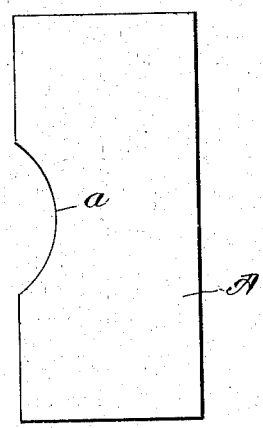
Fig. 3.
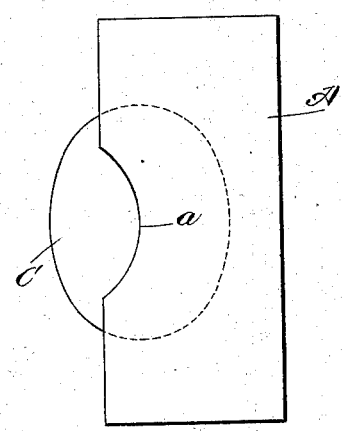
Fig. 4.
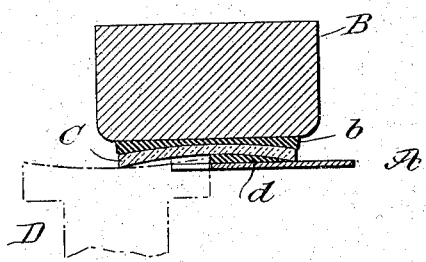
Fig. 5.
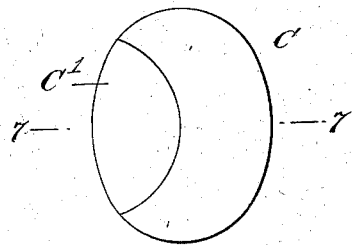
Fig. 6.
Fig. 8.
Fig. 7.
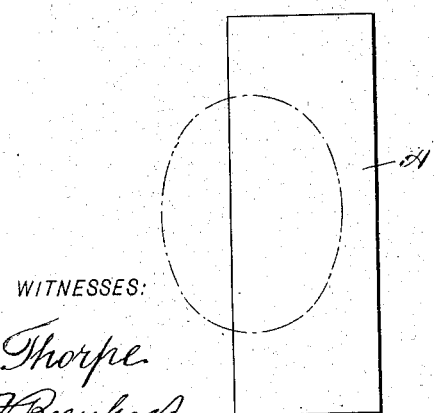
WITNESSES:
Edw. Thorpe
N. J. Bernhard
INVENTOR
Theodore Mundorff
BY Munn & Co.
ATTORNEYS.

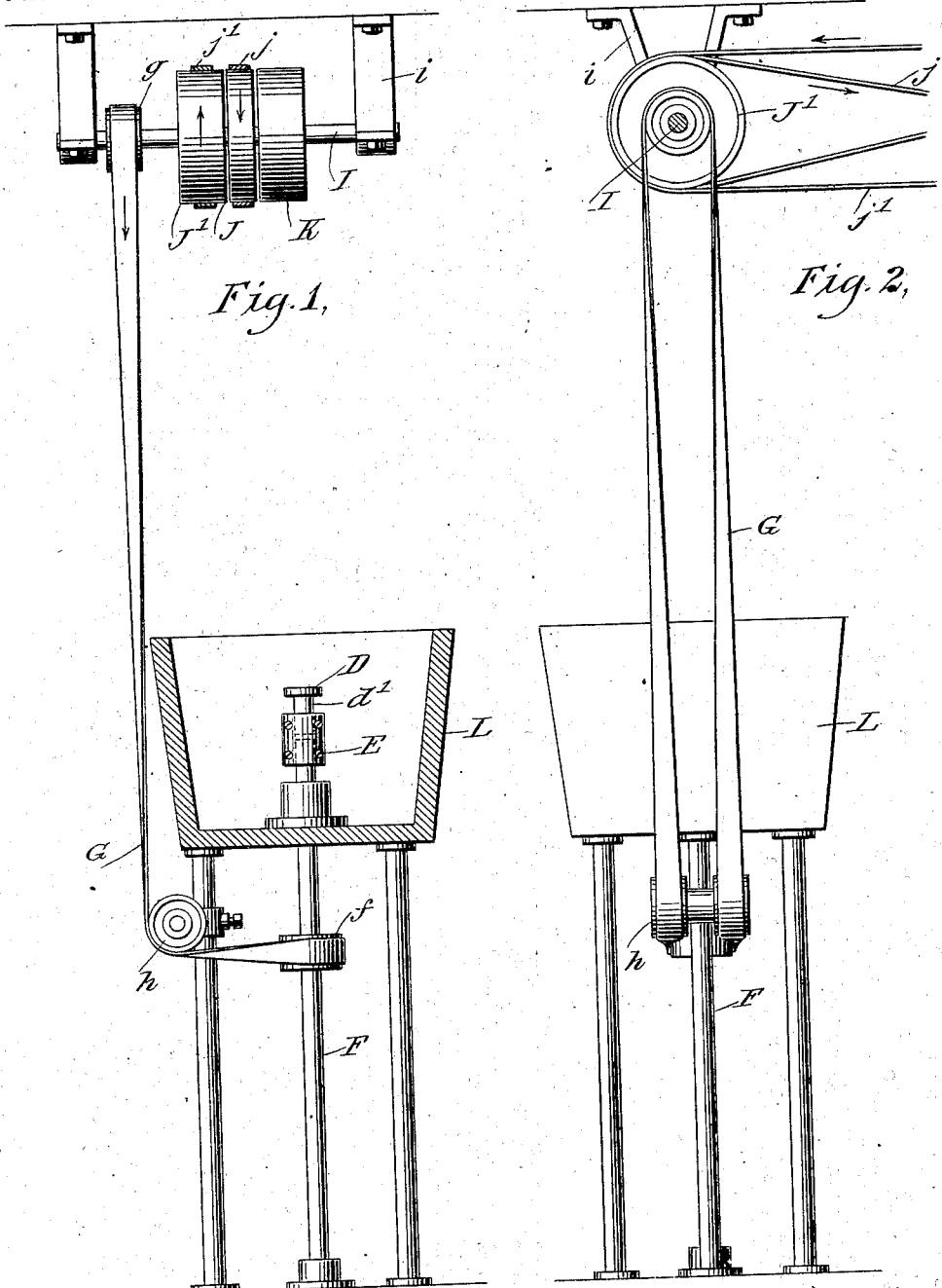

No. 729,781.

Patented June 2, 1903.

UNITED STATES PATENT OFFICE.

THEODORE MUNDORFF, OF NEW YORK, N. Y.

MEANS FOR MAKING BIFOCAL OPTICAL LENSES.

SPECIFICATION forming part of Letters Patent No. 729,781, dated June 2, 1903.

Application filed August 11, 1902. Serial No. 119,260. (No model.)

*To all whom it may concern:*

Be it known that I, THEODORE MUNDORFF, a citizen of the United States, and a resident of the city of New York, borough of Manhattan, in the county and State of New York, have invented new and useful Improvements in a Means for Making Bifocal Optical Lenses, of which the following is a full, clear, and exact description.

My invention relates to means for producing bifocal optical lenses; and the object that I have in view is to enable a one-piece lens having the integral high and lower powers required for near and distant vision to be produced economically, practically, and with the same facility as ordinary one-power lenses, thus enabling opticians to fill prescriptions for bifocal lenses by furnishing to their customers articles which are free from the many practical objections that are urged against the common two-piece lens of this character.

By my invention I am able to produce a one-piece bifocal lens free from a prism by grinding the lens, as will now be described. A lens of the required low power is prepared or selected, and to the face which is to be ground is applied or attached a stop-plate that covers all that part of the lens which is not to be subjected to the abrasive action of the tool. I now take a revoluble tool having a top grinding-face of a radius corresponding to the curve of the desired low-power segment, such tool being of small diameter. In practicing my invention I find it necessary to limit the presentation of the lens to that part of the curved face which lies next to the periphery of the tool. It is now to be understood that the lens and the stop-plate are presented to the tool so that the segment of the lens to form the lower portion of the desired high power is in contact with the curved face at the periphery thereof and the edge of the stop-plate is opposite to the peripheral edge of the tool, whereby the rotation of the tool grinds out that face of the lens left uncovered by the stop-plate and held under pressure in abrasive engagement with the tool.

I have illustrated one suitable form of apparatus for carrying my invention into practice in the accompanying drawings, in which—

Figure 1 is a vertical sectional elevation illustrating the rotary tool in a tank. Fig. 2 is an elevation looking at the left-hand end of Fig. 1. Fig. 3 is a detail plan view of a plate for stopping out a portion of the lens. Fig. 4 is a view of the plate applied to the lens. Fig. 5 is a vertical section of the lens-holder and the stopping-out plate applied to a lens and showing the parts in working position on a rotary tool, the latter being indicated by dotted lines. Fig. 6 is a detail plan view of a complete bifocal lens, and Fig. 7 is a cross-section thereof on the line 7 7 of Fig. 6; and Fig. 8 is a detail plan view of another form of stopping-out plate, the lens being indicated by dotted lines.

One of the important elements employed by me in grinding a bifocal lens is a plate A, which is adapted to be secured in a suitable way along with the lens to a holder B, the latter being similar to devices which are ordinary in the art. The plate A is employed for stopping out the upper part of the lens adapted for distant vision, and said plate may be of the form shown by Figs. 3 and 4 or by Fig. 8, according to the shape and area which it is desired to impart to the lower high-power segment of the lens. The plate is made from a single piece of flat metal, and in the form shown by Figs. 3 and 4 said plate is provided in one edge with a curved recess *a*. In Fig. 8, however, the stopping-out plate is provided with continuous edges, which are parallel to each other.

The lens-holder B is a solid block having a flat lower face to which the lens C is adapted to be secured in the ordinary way—that is to say, a layer of cement *b* is applied to the flat face of the lens-holder, and against this cement layer is placed the convex face of the lens C. The stopping-out plate A is applied against the under or concave face of the lens, so as to cover all that part of the convex face which is not to be ground, and this plate is held firmly against the lens by another layer of cement *d*. The recessed edge *a* of the stopping-out plate exposes the concave face of the lens at the lower portion thereof, and this exposed part of said lens is adapted to be ground to produce the high-power segment, which is devoted to near vision.

The abrading-tool D which I employ is of small size; in fact, it is considerably smaller than the tools ordinarily employed in grinding optical lenses. The tool has a top face, which is curved on a radius corresponding to the curvature of the face forming the high-power section of the lens, and said tool is provided with a shank $d'$, adapted to be secured in a holder E. (See Fig. 1.) It is necessary to employ a number of these abrading-tools having active faces of different curvature, so as to correspond to the radii of the different lenses which it is desired to produce by the method and means of my invention.

The rotary tool-holder is carried on the upper end of a vertical shaft F, having a pulley $f$, around which passes an endless driving-belt G. Suitable guide-sheaves $h$ are supported substantially in the horizontal plane of the pulley $f$, and from these sheaves the endless belt G passes around a driving-pulley $g$ on an overhead shaft I, the latter being shown journaled in suitable hangers $i$. This overhead shaft is provided with fast pulleys J J', and with an idler pulley K, and around the pulleys J J' are adapted to pass the bolts $j\,j'$ for the purpose of driving the shaft I and the tool-shaft F in different directions. The upper end of the shaft F passes through the bottom of a tank L, within which is arranged the tool-holder E and the abrading-tool D.

In preparing the bifocal lens in accordance with my invention I first select a lens C, which is of the required low power, said lens either being taken from a stock of lenses or ground according to the required focus in any of the ways known to the trade. The lens C is now applied or united to the bottom face of the holder B by the layer of cement $d$, and against the under face of this lens is applied the other layer of cement $d$, the latter covering all that part of the lens which is not to be ground, and finally the stopping-out plate A is applied against the cement layer $d$, whereby the lens is securely attached to the holder and the stopping-out plate is united to the lens, the latter lying in a plane between the holder and the stopping-out plate. The operator now adjusts the holder and its attached parts over the active face of the tool; but care must be taken to present the recessed edge $a$ of the plate to the peripheral edge of the tool, while the exposed under face of the lens is brought into contact with the tool on that part of its active face which lies next to the periphery of said tool. Of course a tool having a working face of proper curvature is selected and fastened in the revoluble-holder E on the vertical shaft, and the usual abrading material in a moistened condition is spread over the active face of the tool. It is only necessary to start the machine in operation for the purpose of rotating the tool rapidly and for the operator to press downward upon the holder B in the ordinary way; but in manipulating the holder the recessed edge $a$ of the stopping-out plate must be held by the operator in contact with the edge of the tool. A portion of the lens is thus ground to the focus required for the high-power segment C', and after the grinding shall have been completed the lens is removed from the holder and the stopping-out plate to be finally finished and polished in the ordinary way.

Having thus described my invention, I claim as new and desire to secure by Letters Patent—

1. As a means for grinding bifocal lenses, a holder and a stop-plate adapted to be united to an interposed lens for the stop-plate to partially cover the lens and to expose that part of the lens's surface which is to be ground, combined with a rotary abrading-tool to which the lens and the stop are presented for the edge of said stop-plate to ride against the periphery of the tool.

2. As a means for grinding lenses, a stop-plate provided in an edge thereof with a curved recess, and a holder to which the lens and the stop-plate are united, with the lens interposed between the holder and the plate, and with the latter covering the lens's surface except at the recessed edge thereof, combined with a revoluble tool to which the lens and the stop-plate are presented.

In testimony whereof I have signed my name to this specification in the presence of two subscribing witnesses.

THEODORE MUNDORFF.

Witnesses:
JOSEPH KLEIN,
FRED VOELTEL.